No. 832,495. PATENTED OCT. 2, 1906.
G. A. MILLETT.
RESERVOIR GATE.
APPLICATION FILED JAN. 4, 1906.

3 SHEETS—SHEET 1.

Witnesses
C. K. Reichenbach
F. C. Jones

Inventor
G. A. Millett

By
Chandler Chandler
Attorneys.

No. 832,495. PATENTED OCT. 2, 1906.
G. A. MILLETT.
RESERVOIR GATE.
APPLICATION FILED JAN. 4, 1906.

3 SHEETS—SHEET 2.

Witnesses
C. K. Reichenbach.
F. C. Jones

Inventor
G. A. Millett
By
Attorneys

No. 832,495. PATENTED OCT. 2, 1906.
G. A. MILLETT.
RESERVOIR GATE.
APPLICATION FILED JAN. 4, 1906.
3 SHEETS—SHEET 3.
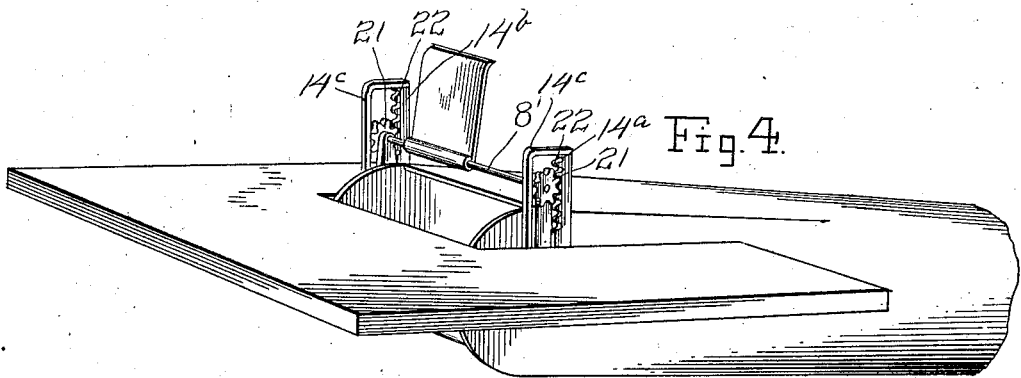
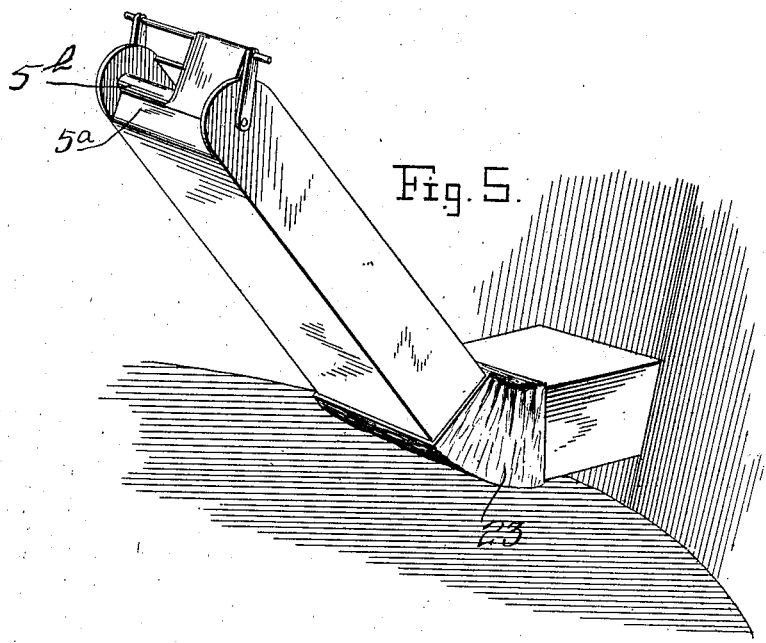
Witnesses
C. K. Reichenbach
F. C. Jones
Inventor
G. A. Millett.
By 
Attorneys.

UNITED STATES PATENT OFFICE.

GEORGE A. MILLETT, OF CEDAR CITY, UTAH.

RESERVOIR-GATE.

No. 832,495.

Specification of Letters Patent.

Patented Oct. 2, 1906.

Application filed January 4, 1906. Serial No. 294,631.

*To all whom it may concern:*

Be it known that I, GEORGE ALMA MILLETT, a citizen of the United States, residing at Cedar City, in the county of Iron, State of Utah, have invented certain new and useful Improvements in Reservoir-Gates; and I do hereby declare the following to be a full, clear, and exact description of the invention, such as will enable others skilled in the art to which it appertains to make and use the same.

This invention relates to gates for reservoirs, and has for its object to provide a device of this nature which shall include means for obtaining a flow of water having a constant volume regardless of the amount of water in the reservoir.

A further object of the invention is to regulate the flow of the water.

Figure 1:
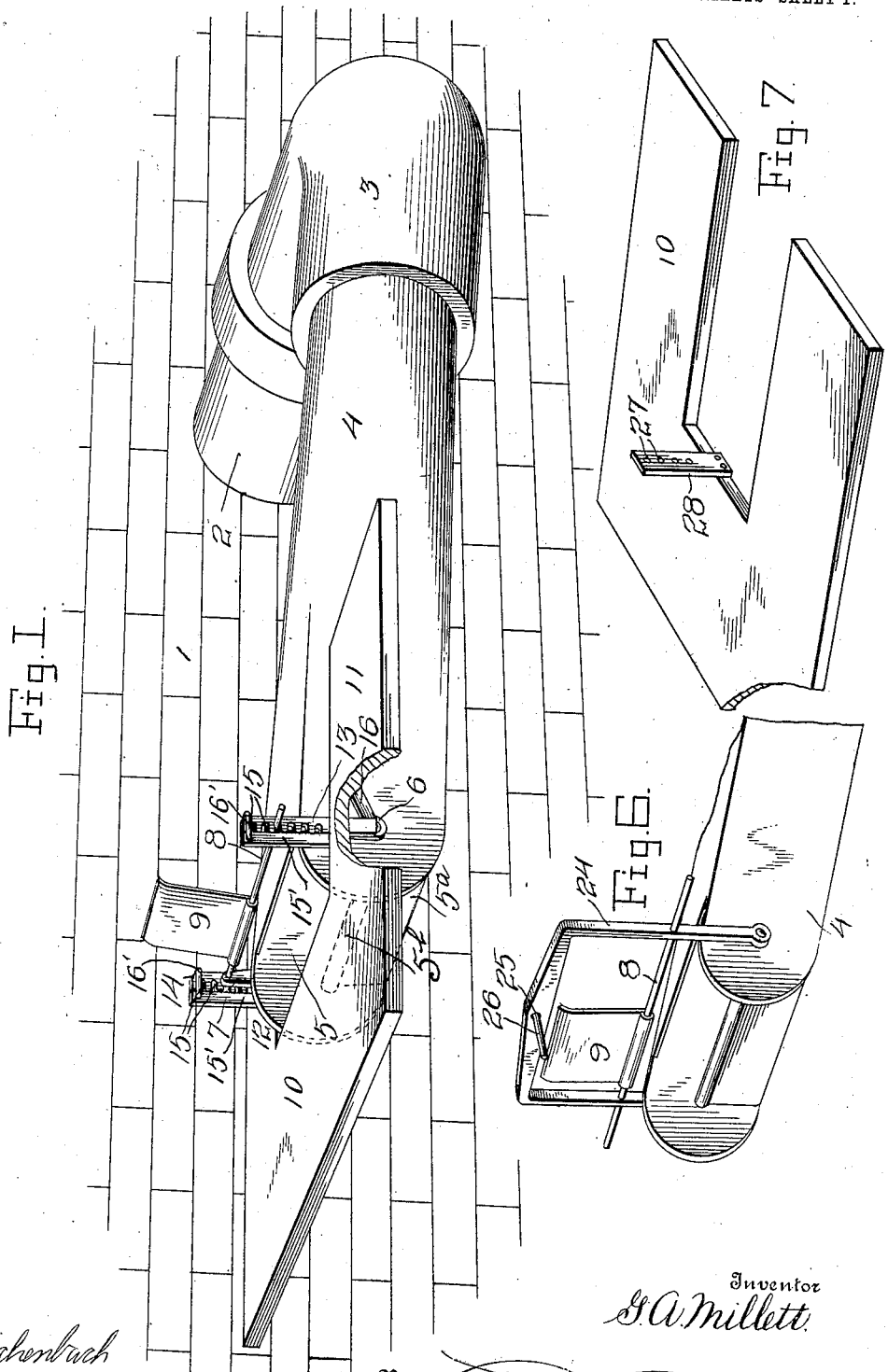
Figure 2:
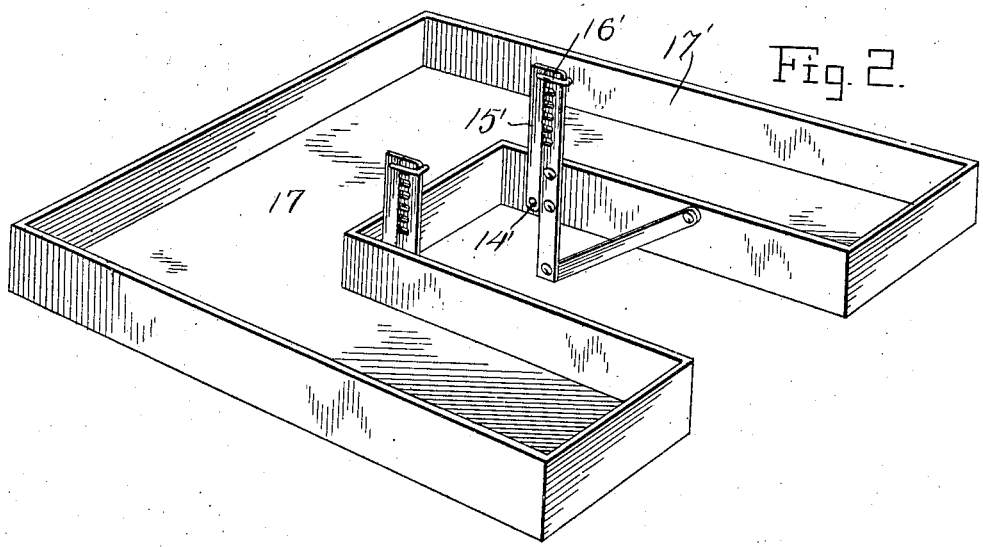
Figure 3:
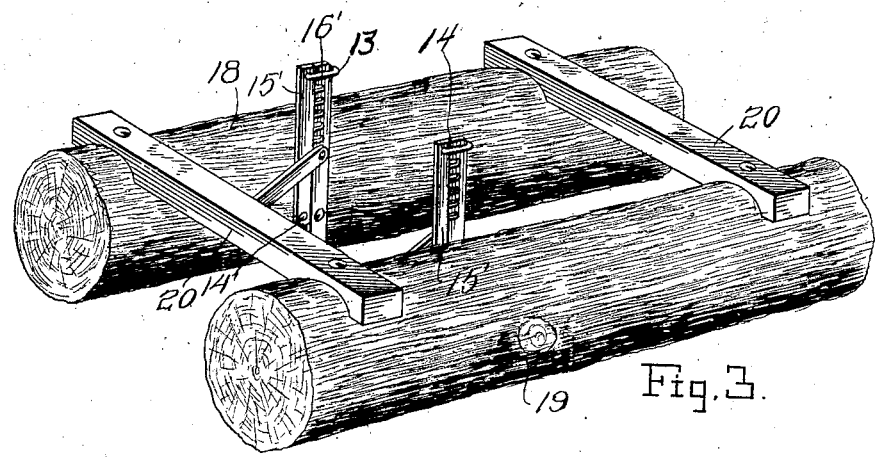

In the accompanying drawings, Figure 1 is a perspective view of the preferred form of my invention, showing the same in use. Fig. 2 is a perspective view of a modified form of float. Fig. 3 is a similar view showing a further modification of the same. Fig. 4 is a perspective view showing a further modification of my invention as regards the form shown in Fig. 1. Fig. 5 is a perspective view showing a modified form of connection between the spillway and the flume. Fig. 6 is a perspective view of a still further modified form of spillway, and Fig. 7 is a similar view of a modified form of float for the same.

Referring to the drawings, the numeral 1 denotes the wall of a reservoir, and 2 the outlet-flume for the same. Swiveled to the inner end of the flume 2 is an elbow 3, in the opposite end of which is engaged the inner end of a spillway 4. The spillway 4 is open at its outer end, as shown at 5, and has its sides extended beyond its top and bottom walls, the bottom wall of the spillway being turned upwardly between the sides, as shown at $5^a$, and over upon itself, as at $5^b$. Secured at their lower ends at opposite points upon the sides of the spillway and extending upwardly therefrom are standards 6 and 7, in which is mounted a rod 8, which carries a head-gate 9, the standards 6 and 7 extending to such a height above the spillway that the head-gate 9 when swung downwardly will have its end resting against the upturned portion $5^a$ of the bottom of the spillway. A float including a body 10 is preferably in the form of a platform and includes side members 11 and 12, which when the float is in proper position with relation to the spillway 4 extend upon each side of the same, the body 10 of the float lying slightly beyond the outer end of the said spillway. Secured at opposite points to the inner edges of the side members 11 and 12 are uprights 13 and 14, respectively, the said uprights being provided with corresponding edges with rack-teeth 15, between which the ends of the rod 8 are adapted to be interchangeably engaged. Bars 16 are connected at one of their ends to the lower end of the uprights 13 and 14 and at the other of their ends to the respective inner edges of the side members 11 and 12 of the plate. Pivoted, as at 14', to the inner edges of the side members 11 and 12 and adjacent the rack edges of the uprights 13 and 14 are keepers 15', which are provided at their upper ends with links 16', arranged for engagement over the upper end of the uprights 13 and 14, the said keepers serving to retain the rod 8 in its adjusted position between the rack-teeth 15 of the said uprights.

In the form of float shown in Fig. 2 I provide a construction of float including a platform 17 of the same construction as the platform 10 and secure sides 17' to the edges of the said platform, the said sides 17' serving to a certain extent in preventing flowing of water over the upper side of the platform.

In Fig. 3 I have shown a still further modified form of float, the same comprising logs 19 and 19, which are held in parallel relation to each other by means of end cross-pieces 20 and secure upon the opposing faces of the logs uprights 13 and 14 and keepers 16' of the same construction as those shown in Fig. 1.

In Fig. 4 I show a form of my invention which includes a slightly-modified means for adjusting the spillway. In this form the uprights $14^a$ and $14^b$ include yoke members $14^c$, and the rod 8' is provided with pinions 21, which are in mesh with rack-teeth 22, formed on the edges of the uprights $14^a$ and $14^b$ adjacent the yoke members $14^c$, the said yoke members serving to hold the said pinions in proper engagement with the said rack-teeth.

In the form shown in Fig 5, I dispense with the elbow 3 and employ a flexible bellows connection 23, which permits of vertical swinging of the spillway with respect to the flume.

In Figs. 6 and 7 there are shown modified forms of the invention, and in these figures the numeral 24 denotes an inverted-U-shaped frame, to the lower end of the arms of which is pivoted the outer end of the spillway 4. The connecting portion of the U-shaped frame is provided at its middle with an opening 25 for the reception of a pin 26, which is adapted for interchangeable engagement with a series of openings 27 in a vertical standard 28, carried by the float 10.

In operation the opened end 5 of the spillway 4 is always held by means of the float 10 at or adjacent the surface of the water in the reservoir, and it will thus be seen that the pressure upon the water entering the spillway is always the same, and hence the volume of water entering the same in a given time is a constant one. It will be readily understood that by swinging the head-gate 9 into engagement with the upturned portion 5ª of the spillway the inrush of the water into the said spillway will be retarded.

It will of course be understood that different widths of head-gates may be employed or that several head-gates of different widths may be mounted upon the rod 8, according to the conditions under which the gate is used.

What is claimed is—

1. In a device of the class described, a spillway, means for partially closing the mouth of said spillway, a float, and means associated with said last-named means for adjustably connecting the said spillway to said float.

2. In a device of the class described, a spillway having a flanged bottom wall, and means arranged for engagement with said flanged bottom wall for partially closing the mouth of said spillway to retard the entrance of water into the same.

3. In a device of the class described, a spillway having a flanged bottom wall, and a head-gate arranged for engagement with said flanged bottom wall for partially closing the mouth of said spillway to retard the entrance of water into the same.

4. In a device of the class described, a spillway having a flanged bottom wall, standards carried by said spillway, a rod mounted in said standards, and a head-gate carried by said rod and arranged at times to lie against said flanged bottom wall to partially close the mouth of said spillway to retard the entrance of water into the same.

5. In a device of the class described, a spillway, standards carried by said spillway, a rod mounted in said standards, a head-gate carried by said rod, a float, and means associated with said float and arranged for engagement with said rod for adjusting said float vertically with respect to said spillway.

6. In a device of the class described, a spillway, standards carried by said spillway, a rod mounted in said standards, a head-gate carried by said rod, a float, and standards including rack-teeth for engagement with said rod whereby said float may be adjusted vertically with respect to said spillway.

7. In a device of the class described, a spillway, standards carried by said spillway, a rod mounted in said standards, a head-gate carried by said rod, a float, standards including rack-teeth carried by said float and arranged for engagement with said rods, and keepers carried by said float and arranged to hold said rod in engagement with said teeth.

8. In a device of the class described, a spillway, standards carried by said spillway, a rod mounted in said standards, a head-gate carried by said rod, a float, rack members carried by said float and arranged for engagement with said rod, keepers carried by said float and arranged to hold said rod in engagement with said teeth, and means associated with said keepers and arranged for engagement with said rack members to hold the said keepers in engagement with said rack members.

In testimony whereof I affix my signature in presence of two witnesses.

GEORGE A. MILLETT.

Witnesses:
WM. HOUCHEN,
JOHN PARRY.